Dec. 14, 1954  L. V. FAIRCLOTH ET AL  2,696,928
PIVOTED PLATFORM TRUCK
Filed Oct. 23, 1950
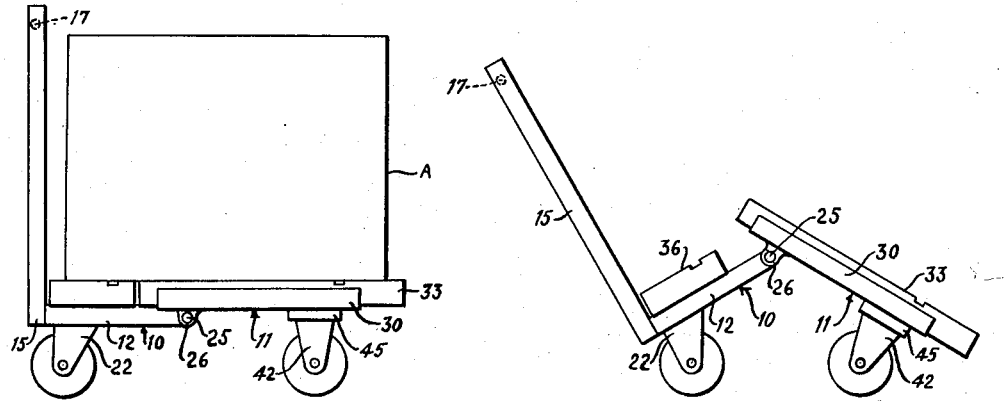
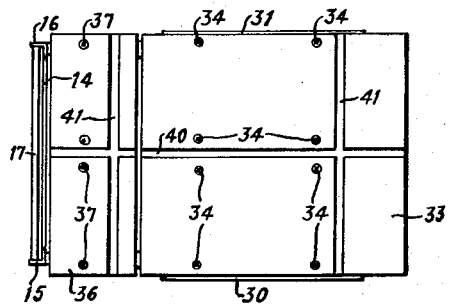
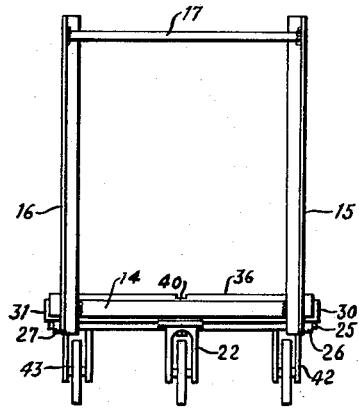
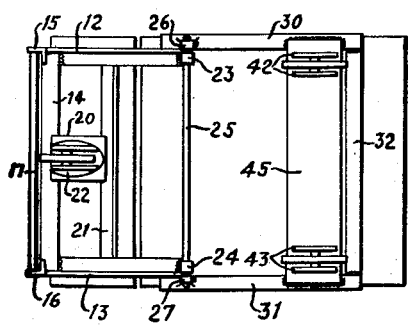
LEE V. FAIRCLOTH
AND
LESTER J. BURNS,
INVENTORS
BY  Eaton + Bell
ATTORNEYS

United States Patent Office 2,696,928
Patented Dec. 14, 1954

2,696,928
PIVOTED PLATFORM TRUCK

Lee V. Faircloth and Lester J. Burns, Laurens, S. C.

Application October 23, 1950, Serial No. 191,602

5 Claims. (Cl. 214—506)

This invention relates to wheeled trucks and more especially to a wheeled truck for transporting bulky articles such as packing cases, bales and the like and which truck has a base or platform mounted on wheels and hinged intermediate its ends to permit the platform to be broken into two sections at the hinge point and said sections being movable into angular relation with each other to facilitate loading and unloading of the truck.

It is an object of this invention to provide a wheeled truck having a platform comprising a first section and a second section hingedly secured to each other intermediate the ends of the platform and said first and second sections being supported by wheels connected thereto. The first section extends in a horizontal plane and the second section is disposed in a horizontal plane in alinement with the first section and in closely parallel relation to the first section. The first section is provided with upright members interconnected a substantial distance above the section by a bar for pushing or pulling the truck and for manipulation during unloading. The second section is preferably longer than the first section and is hingedly connected intermediate its ends to the proximate end of the first section so that a portion of the second section will be superposed upon the proximate first section when the two sections are in normal or horizontal position.

The off-center position of the hinge point causes the sections of the platform to normally remain in a substantially horizontal position and to support weight without collapsing and also permits the two sections to be moved into angular relation with each other to permit an article to be unloaded from the truck by gravity and be headed up onto the adjacent floor or the like.

Some of the objects of the invention having been stated, other objects will appear as the description proceeds when take in connection with the accompanying drawings in which—

Figure 1 is a side elevation of the improved truck in normal position and showing an article thereon;

Figure 2 is a side elevation similar to Figure 1 but omitting the article carried by the truck and showing the two sections of the platform pivoted into an angular attitude with respect to each other;

Figure 3 is a top plan view of the truck looking at the top of Figure 1 but omitting the article carried thereby;

Figure 4 is a bottom plan view looking up at the bottom of Figure 1;

Figure 5 is an end view of the truck looking at the left-hand side of Figure 1.

Referring more specifically to the drawings, the numerals 10 and 11 indicate the first and second platform sections, respectively, of the truck which are hingedly connected to each other in a manner to be presently described. The first platform includes substantially parallel spaced side frame members 12 and 13 to one of the ends of which are suitably secured, as by welding, opposed ends of a transverse frame member 14, the frame members 12, 13 and 14 being shown in the form of angle bars. Also, suitably secured to the ends of the parallel side frame members 12 and 13 are the lower ends of vertically disposed upright frame members 15 and 16 respectively, which are held in rigid spaced relation to each other at their upper ends by a suitable bar 17 suitably secured at its opposed ends to the bars 15 and 16 as by welding. The bar 17 is preferably circular in cross-section to serve as a handle for pushing or pulling the truck from one plate to another, and for manipulation of the trucks during unloading.

A plate 20 is suitably secured to the lower surface of the transverse frame member 14 as well as to a transverse frame member 21 as by welding, and has a suitable pivoted caster 22 secured thereto. The transverse frame member 21 is spaced from the frame member 14 and is suitably secured at opposed ends thereof to the proximate edges of the parallel side frame members 12 and 13 by any suitable means such as welding. The frame member 21 is also shown in the form of an angle bar. If desired, the plate 20 could project beyond the first section to provide a rest or brace for the operator's foot during unloading and to increase the span between the truck wheels.

The ends of the frame members 12 and 13 remote from the transverse frame member 14 have suitable sleeves 23 and 24 formed thereon or suitably secured thereto which encircle a pivot rod or axle 25 which serves as a hinge pin between the first platform section 10 and the second platform section 11. The pivot rod 25 extends substantially beyond opposed ends of the sleeve portions 23 and 24 of the respective frame members 12 and 13 and has bearing portions 26 and 27 of longitudinally extending side frame members 30 and 31, respectively, of the second platform section 11 pivotally mounted thereon.

It will be observed in Figure 4 that the frame members 30 and 31 of the second platform section 11 are spaced apart from each other a slightly greater distance than the distance from the outer surface of the frame member 12 to the outer surface of the frame member 13 and the bearing portions 26 and 27 of the second platform section 11 are disposed intermediate the ends of the longitudinally extending frame members 30 and 31. Thus, portions of the side frame members 30 and 31 of the second platform section 11 are disposed in over-lapping relation to the side frame members 12 and 13, respectively, of the first platform 10 for purposes to be later described.

A transverse frame member 32 is welded at opposed ends thereof to the ends of the side frame members 30 and 31 remote from the first platform section 10. The frame members 30, 31 and 32 support a suitable floor section or deck 33 suitably secured thereto, as by screws 34. The side frame members 30 and 31 are preferably right angular in cross-section so the floor section or rear deck 33 may be supported therebetween. It will be noted in Figures 1, 2 and 4, that the deck or floor section 33 extends a substantial distance beyond opposed ends of the side frame members 30 and 31. Thus, upon the platforms 10 and 11 assuming substantially the position shown in Figure 1 in close parallel relation to each other, the portion of the deck 33 extending beyond the pivot rod 25 will engage and rest upon the upper surfaces of portions of the side frame members 12 and 13 to thus prevent the medial portion of the platform from sagging upon a load such as the article A being positioned thereon.

Another floor section or deck 36 is suitably secured to the upper surfaces of the side frame members 12 and 13 of the first platform section 10, as by screws 37. The flanges of the angle bars forming the side frame members 12 and 13 preferably face downwardly so as to permit the opposed side portions of the deck 36 to extend a substantial distance beyond the opposed side edges of the side frame members 12 and 13 and to terminate in the same vertical plane as the edges of the deck 33. Also, the deck 36 terminates a substantial distance short of the pivot rod 25 to permit the deck 33 and its respective frame members 30 and 31 to be superposed in overlapping relation to the side frame members 12 and 13 of the first platform section 10.

For purposes of clarity the deck 36 may be termed a first deck and the deck 33 a second deck. The decks 36 and 33, respectively, have longitudinally extending and transversely extending grooves 40 and 41 which may be provided to facilitate the wrapping of strand or tape material about a box, carton, bale or the like, such as the article A in Figure 1, for binding the same.

Suitable fixed casters 42 and 43 are suitably secured to the lower surface of the second platform section 11 for supporting the truck. In this instance, the casters 42 and 43 are shown secured to the lower surface of a transverse plate 45 which extends between and has its opposed ends suitably secured, as by welding, to the side frame members 30 and 31. However, any suitable wheels may be used and may be secured directly to the deck 33 if desired, omitting the plate 45. The rear casters 42 and 43 are referred to as fixed casters since, although, the wheels thereof rotate, the casters do not pivot on an axis perpendicular to the axis of the wheel carried thereby while the caster 22 may rotate on a vertical axis or on an axis perpendicular to the axis of the wheel carried thereby.

It is thus seen that there is provided an improved hand truck having first and second platform sections, the first platform section being hingedly connected at its end intermediate the ends of the second platform section and to the bottom thereof so the second platform section may be tilted relative to the first platform to facilitate placing articles on the truck and then the first platform section may be released to permit the two sections to move into alinement with a portion of the second section being supported by the first section, each of the platform sections are provided with a suitable floor or deck so the upper surfaces of the platform sections may normally be disposed in the same horizontal plane for supporting articles thereon.

In practice it has been found that one man using a truck of the type described can safely "head up" or stand on end, a 750 pound package or more without help due to the manner in which the truck platform or bed is pivoted. When the truck is in motion, a slight backward pull by the operator on rod 17 will cause the truck to unbalance at the pivot point to "head up" or stand on end the article or package carried thereon. As the upright frame members 15 and 16 supporting the rod 17 are substantially longer than the frame members 12 and 13 of the first truck section, a good mechanical advantage is gained and relatively little force is required to bring a heavily laden truck into the position shown in Figure 2 or from that position back to that of Figure 1 during loading.

It should be noted that the relationship of the pivot point to the truck bed may be varied, if desired, depending upon the size of the article to be handled, and various other changes in the particular structure illustrated in the drawing could be made without departing from the spirit of the invention or the scope of the accompanying claims. For example, lugs could be added to the sides of the truck platform to limit side slip of the load, additional bracing members for the parts could be added, solid platforms could be dispensed with, and, as heretofore indicated, the rear casters could be spaced rearwardly of the truck section to increase the span between casters and to provide a rest or brace for the foot of the operator. Other variations will occur to those skilled in the art.

In the drawings and specification, there has been set forth a preferred embodiment of the invention and although specific terms are employed, they are used in a generic and descriptive sense only, and not for purposes of limitation, the scope of the invention being defined in the claims.

We claim:
1. A truck of the class described comprising a first platform section and a second platform section, one end of the first platform section being hingedly connected to the second platform section intermediate the adjacent and remote ends of the second section relative to the first section, an upstanding handle being secured to said first platform section at the end thereof opposite to said hingedly connected end, wheels secured to and supporting each of said sections, a deck carried by the first platform section and terminating substantially short of the end of the first platform section which is hingedly connected to the second platform section, a second deck carried by the second platform section, and the end of the second deck adjacent the first platform section extending a substantial distance beyond the point at which the first platform section is hingedly connected to the second platform section and normally being superposed upon a portion of the first platform section and bearing against the upper edge of the first platform section to hold the two platform sections in rigid relation to each other upon weight being applied to the upper surfaces of said platform sections, whereby by the application of force to said handle member the two platform sections may be pivoted relative to each other to facilitate the placing of objects on the decks of the platform sections.

2. An improved hand truck having a platform including a first platform section having an upstanding handle member at one end thereof, a second platform section hingedly connected to the other end of the first platform section intermediate the ends of the second platform section, a pair of spaced casters supporting the second platform section and spaced from the hinge point, at least one caster supporting the first platform section and spaced from the hinge point, whereby by the application of force to said handle member the platform sections may be raised at their juncture for tilting the same about the axes of their corresponding casters for loading and unloading purposes and whereby the platform sections will be moved downwardly at their juncture and one end of the second platform section supported by the proximate end of the first platform section and the hinge connection under the force of a load bearing on said platform sections, said truck also having a first deck secured to the upper surface of the first platform section and terminating a substantial distance short of the hinged end of said first platform section, a second deck secured to the upper surface of the second platform section and extending substantially beyond the hinged end of the second platform section to a point in closely spaced relation to the end of the first deck.

3. An improvement in hand trucks and the like, said improvement comprising a first and a second wheeled frame, hinge means connecting the first wheeled frame to the second wheeled frame and said wheeled frames being so constructed as to cause a portion of the second wheeled frame to overlap the first wheeled frame and to be supported thereby when the wheeled frames are disposed in substantially the same horizontal plane, an upstanding handle member being secured to the end of said first frame remote from said hinge means, whereby the first and second wheeled frames may be pivoted relative to each other for loading and unloading purposes by the application of force to said handle member, said first wheeled frame having a floor thereon terminating a substantial distance short of the hinge means, said second wheeled frame having a floor thereon extending substantially beyond the hinge means to assist in lending rigidity to the wheeled frames with respect to each other when the wheeled frames are disposed in substantially the same horizontal plane and the floors of the first and second wheeled frames being of such thickness that the upper surfaces thereof will be disposed in the same horizontal plane when the first and second wheeled frames are disposed in substantially the same horizontal plane.

4. A hand truck comprising a platform composed of first and second sections in juxtaposed relationship, a hinge member carried beneath one of said sections and extending beneath the other of said sections for a portion of its length, being pivotally connected thereto at its termination, wheel means supporting the end of said first section remote from said second section, an upstanding handle carried by said first section for applying leverage to said section to tilt the same upwardly, said wheel means functioning as a fulcrum and said second section being substantially longer than said first section and said first section being substantially shorter than said up-standing handle to thereby provide a mechanical advantage in pivoting said first section with respect to said second section, and wheel means supporting said second section between the ends thereof.

5. A hand truck according to claim 4 wherein the wheel means supporting said second section are spaced from both ends of said section.

References Cited in the file of this patent
UNITED STATES PATENTS

| Number | Name | Date |
|---|---|---|
| 637,650 | Northrop | Nov. 21, 1899 |
| 661,783 | Allan et al. | Nov. 13, 1900 |
| 687,284 | Stebbins | Nov. 26, 1901 |
| 1,377,147 | Dillon | May 3, 1921 |
| 1,704,351 | Talbert | Mar. 5, 1929 |
| 1,706,253 | Raymond | Mar. 19, 1929 |
| 1,777,694 | Halteman | Oct. 7, 1930 |
| 1,924,885 | Schreck | Aug. 29, 1933 |
| 2,342,430 | Shackleton et al. | Feb. 22, 1944 |
| 2,415,876 | Gruber | Feb. 18, 1947 |
| 2,470,054 | Schildmeier | May 10, 1949 |
| 2,494,725 | Schwitzer et al. | Jan. 17, 1950 |